United States Patent
Lee

(10) Patent No.: US 6,798,739 B1
(45) Date of Patent: Sep. 28, 2004

(54) MECHANISM FOR SPLICING TREES

(75) Inventor: Cheng Yin Lee, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 745 days.

(21) Appl. No.: 09/588,904

(22) Filed: Jun. 7, 2000

Related U.S. Application Data

(60) Provisional application No. 60/137,717, filed on Jun. 7, 1999.

(51) Int. Cl.[7] .............................................. H04L 12/44
(52) U.S. Cl. ...................................... 370/216; 370/408
(58) Field of Search ................................ 370/216, 217, 370/221, 225, 390, 256, 408, 432; 709/221, 238

(56) References Cited

U.S. PATENT DOCUMENTS

| | | | |
|---|---|---|---|
| 4,740,954 A | | 4/1988 | Cotton et al. .................. 370/60 |
| 5,331,637 A | * | 7/1994 | Francis et al. ............... 370/408 |
| 5,781,537 A | * | 7/1998 | Ramaswami et al. ....... 370/254 |
| 5,831,975 A | * | 11/1998 | Chen et al. .................. 370/256 |
| 5,878,232 A | | 3/1999 | Marimuthu ............ 395/200.79 |
| 5,905,871 A | | 5/1999 | Buskens et al. ........ 395/200.75 |
| 6,032,194 A | | 2/2000 | Gai et al. .................... 709/239 |
| 6,055,561 A | * | 4/2000 | Feldman et al. ............ 709/200 |
| 6,128,305 A | * | 10/2000 | Hjalmtysson et al. ....... 370/410 |
| 6,381,639 B1 | * | 4/2002 | Thebaut et al. ............. 709/222 |

OTHER PUBLICATIONS

Perlman R. et al, "Simple Multicast: A Design for Simple, Low–Overhead Multicast ^M," Feb. 1999.

* cited by examiner

Primary Examiner—Huy D. Vu
Assistant Examiner—Daniel Ryman

(57) ABSTRACT

A method for detecting a routing loop when repairing a bidirectional multicast distribution tree is disclosed. According to the method, a splice message is launched from an originating node attempting to join a bidirectional multicast tree and is sent to a root-node to find out if a routing loop is formed when a node is joining the multicast distribution tree. Depending on the multicast application requirement, when a routing loop is detected during the repairing of a multicast distribution tree, the severed node may abort, or the repair can be deferred until the connection to the root-node is re-established. The loop detection and loop prevention method of the invention may be used as a loop avoidance mechanism with any protocol for repairing a partitioned tree.

13 Claims, 1 Drawing Sheet

MECHANISM FOR SPLICING TREES

This application claims the benefit of Provisional application 60/137,717 filed Jun. 7, 1999.

BACKGROUND OF THE INVENTION

1. Field of Invention

The present invention generally relates to multicast distribution trees and in particular to a mechanism for avoiding loops when a distribution tree is constructed.

2. Related Art

Simple Multicast (SM) uses a single concept working within and between domains, by offering a simplified concept for multicast distribution using the core node "C" address and the multicast address "M" ("M" is unique for a given "C"). By leaving only "C" and M" in the data-packet header, routers along a path in the multicast distribution tree have to figure out the location of "C" using only "M". It reduces the states necessary in routers for supporting multicast distribution while providing a simple and reliable solution with increased speed and a lower overhead.

A bidirectional distribution tree, as opposed to the per-source unidirectional distribution tree, is an effective solution for data delivery from non-core sources. Traffic can be injected from any point and data from a source node does not have to be tunneled first to the core "C". It is also more robust since the core "C" is considered as another node in the tree and when "C" is down, the partitioned tree may still be used until the link/s to "C" is/are re-established.

A parent node in a multicast distribution tree transmits HEARTBEAT (HB) messages to its children at regular intervals and continues to send these messages even if it stops receiving HB messages from its parent such that a subtree may continue to function even if the core is dead. If the core is not dead, or if the path to the core has changed, the parent can simply re-join the multicast tree without disrupting the nodes below. The HB message carries also a "distance from the core" indication.

Keep-Alive (KA) messages are sent to a router by hops from further leafs on the distribution tree, or spanning tree. The router collects KA messages from all its children ports and transmits a KA message to the router which is one hop more than the maximum hops received from any children.

When the distance is great in the HB and KA messages, a loop is suspected and the port removed from the tree. This is a simple loop detection mechanism and can not be used for preventing loops from forming in a spanning tree at the time the tree is repaired.

There are situations like unused branches on a spanning tree, loops involving member nodes, broken/changed path to core, or dead/unreachable core, which require loop detection and/or loop prevention procedures to be provided at the time a tree is repaired.

Methods for detecting and preventing loops formed during the construction phase of a multicast tree are known in the art. For example, U.S. Pat. No. 5,331,637 issued to the same assignee, detects transient loops in unicast routing during the construction of the multicast core based tree (CBT). Transient loops are loops that occur for a short period of time but during their existence they can damage the tree similarly to the non-transient loops. The loop prevention mechanism described in U.S. Pat. No. 5,331,637 has limitations as it does not prevent loops from forming when an upstream link to the root of a tree is down, or the tree is partitioned. The entire downstream tree has to be dismantled and then the whole multicast distribution tree has to be rebuilt.

Suppose that node S shown in FIG. 1. finds through HEARTBEAT messages that the link to the foot node A (link AS) is down and tries to reattach to the multicast distribution tree. Branch S-E-F is detached from the broken tree and the shortest path from the severed node S to A is now via node F, and other links not included in the multicast distribution tree.

According to the method disclosed in U.S. Pat. No. 5,331,637, node S attempts to maintain its connectivity to node A and to re-attach itself to the tree by sending a graft message, or JOIN request control message. The JOIN request is received in this case by node F. It is noted that, packets flowing from node E to node F will be also forwarded back to node S since S is now a downstream node of F.

Node F terminates the JOIN request and sends ACK-BACK to node S. A loop is now formed between nodes S and F, the control packets will be multicasted between F and S and after each looping the number of the control packets is doubled causing damage to the multicast distribution tree. Even if a data packet counter that counts down the time-to-live (TTL) at each hop is used, the number of control packets doubled at each looping is damaging the system before TTL=0.

Current loop detection schemes, try to detect routing loops that normally occur for a short period of time in unicast routing during the construction of the multicast distribution tree (MDT). However, there is no loop protection mechanism provided when the MDT breaks, or is partitioned and needs repairing.

The method in U.S. Pat. No. 5,331,637 uses the JOIN request control message which indicates that a loop exists and at the same time creates a loop as JOIN request must be terminated at node F. This method can not prevent the loop from forming when a node attempting to re-attach to the multicast distribution tree and the node where it grafts to happens to be a downstream node.

Accordingly, there is a need for a mechanism capable to avoid the formation of loops at the time a multicast distribution tree (MDT) is constructed such that a node joining the tree can re-attach itself to any member node.

SUMMARY OF THE INVENTION

The present invention seeks to alleviate totally or in part the drawbacks associated with the prior art multicast distribution tree construction.

According to one aspect of the invention, a method for avoiding routing loops when repairing a bidirectional multicast distribution tree, is provided. The method comprises the steps of launching a splice message from an originating node attempting to join the bidirectional multicast distribution tree and transmitting the splice message towards a root-node along a communications path; creating transient forwarding states for the multicast distribution tree along the communications path; transmitting a splice acknowledgment message from said root-node in response to receiving said splice message; declaring loop-free if the splice message is not returned to the originating node and the splice acknowledgment message generated by the root-node is received by the originating node.

The present invention is not limited to the features disclosed in the "Summary of the Invention" section; it nonetheless may reside on sub-combinations of the disclosed features.

DESCRIPTION OF THE DRAWINGS

The present invention and its advantages will be better understood from the following description of the embodiments of the invention illustrated in the drawings, where.

Similar references are used in different figures to denote similar components.

DETAILED DESCRIPTION OF THE PREFERRED EMBODIMENTS

The following description relates to preferred embodiments of the invention by way of example only and without limitation to the combination of features necessary for carrying the invention into effect.

When a multicast distribution tree is partitioned, the available routing protocol will try to repair the tree with as little as possible disruption of the traffic to the nodes below. To repair such a partitioned multicast tree the downstream subtree, or the node severed from the main multicast distribution tree (MDT), has to be re-attached to the main tree provided a loop is not formed in the process.

According to the invention, a method for detecting and avoiding loops from forming when two multicast distribution trees (MDTs) are spliced, is provided. Depending on the multicast application requirement, when a routing loop is detected during the repairing of a multicast distribution tree (MDT), the severed node may abort, or the repair can be deferred until the connection to the main tree is re-established.

Figure 1:
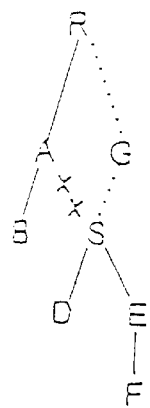
FIG. 1 is an illustration of a branch of a multicast distribution tree.

A SPLICE control message is used as a "loop probe" all the way to the core or root-node R on the main MDT, to discover whether or not there is a potential routing loop forming between a severed node S and root-node R of FIG. 1.

The SPLICE message, unlike the JOIN request, is not terminated by the intermediate routers which are members of the MDT, as they already have forwarding states for the MDT. Thus, the SPLICE message can be sent all the way to the root-node R to make sure that the path to the root-node R is loop-free.

Figure 2:
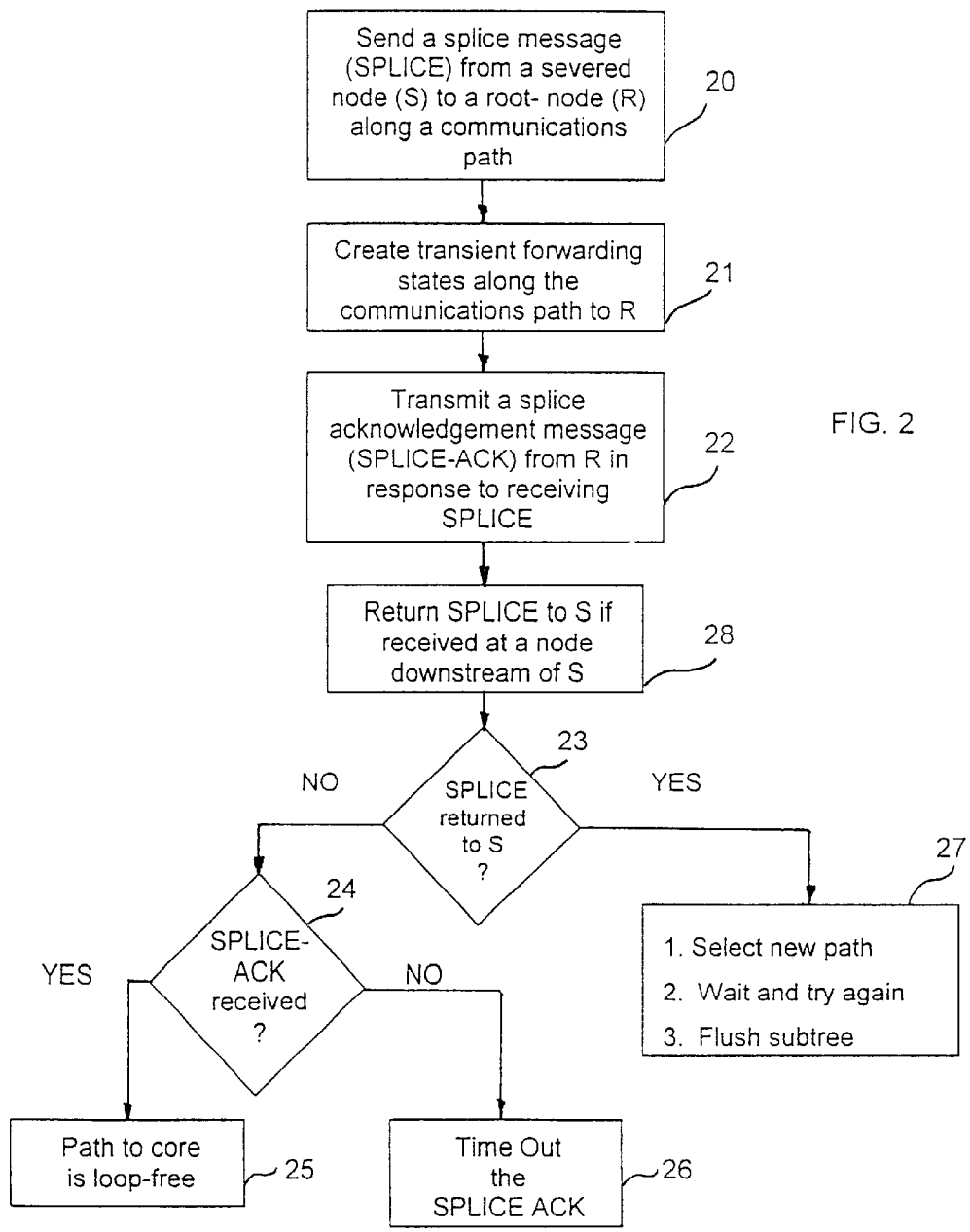
FIG. 2 is a flow chart illustrating the method of avoiding loops during the construction of a multicast distribution tree.

The invention will be now described in connection with FIGS. 1 and 2. Node S, see FIG. 1, discovers the MDT is partitioned, i.e. link AS is down and attempts to rejoin the MDT using the method shown in FIG. 2. In order to re-attach to the multicast distribution tree (MDT), a severed node S launches a SPLICE message, step 20, to detect if a communication path from the severed node S to a root-node R is loop-free. The SPLICE message is forwarded all the way to the root-node R creating transient forwarding states for the multicast tree at nodes along the communication path to the root-node R, step 21. If at any point the SPLICE message is received by a node downstream of S, that message is returned to S, step 28.

If the SPLICE message reaches the root-node R, root-node R sends a SPLICE acknowledgment message (SPLICE-ACK) to S, step 22. At step 23, node S determines whether the SPLICE message has been returned to S. If the SPLICE message has been returned, step 27 is performed as described below. Otherwise, node S determines whether a SPLICE ACK message has been received, step 24.

At step 24 it is determined if the SPLICE-ACK was received at node S. If the severed node S receives a SPLICE ACK message, step 25, this indicates the path to the root is loop-free and the joining node may rejoin the multicast distribution tree (MDT) using the conventional JOIN request control message to splice the subtree. In other words, node S has learned that it can reattach to the multicast tree without causing routing loops. At this stage, node S makes the transient forwarding states (created earlier) permanent.

If the path to the root of the multicast distribution tree loops, the severed node S will not receive any SPLICE ACK message and should time out waiting for the SPLICE ACK message, step 26.

As mentioned before, at step 22, the SPLICE message is forwarded all the way to the core, creating transient forwarding states where there is no existing multicast state, but merely forwarding to the root when there is an existing multicast state. Advantageously, therefore, the method of the invention allows the SPLICE message to create transient forwarding states where no such states exist (like the JOIN request message), while at the same time forward the SPLICE message towards the root-node R if the router receiving the SPLICE message already has an existing forwarding state for the multicast group.

For example, when node G, as shown in FIG. 1, receives the SPLICE message, node G creates transient forwarding states if no such states exist (as if it has received a JOIN-REQUEST message) and forwards the SPLICE message towards the root R. As well, node G makes the transient forwarding state permanent after receiving the SPLICE-ACK (as if it has received a JOIN-ACK message) and forwards the SPLICE ACK to S.

As mentioned before, at step 28, if the SPLICE message hits a downstream node, the message is forwarded until it reaches the router which originated the SPLICE message. If the SPLICE message returns to S, the originating node has now learned that it cannot re-attach to the MDT without causing routing loops.

For example, as shown in FIG. 1, if node F receives the SPLICE message, node F forwards the SPLICE message without creating permanent forwarding states, towards R via E, since E is a downstream node to F. Node E also forwards the SPLICE message without creating forwarding states, towards R. Node S receives the SPLICE message, as S is downstream node to E, and finds out that it is the originator of this message. Node S, therefore, has learned that it can not use this path to reattach to the multicast tree as this process creates a routing loop.

If the originating node cannot re-attach to the MDT without causing routing loops, depending on application requirement conveyed to nodes from root-node R via heartbeat messages, as shown in step 27, the MDT construction protocol can be configured to:

(1) Attempt to rejoin the multicast tree via another next hop (e.g equal cost route to R if available); or
(2) Wait for a pre-defined period (T) before attempting to rejoin R via the same next hop or another next hop, allowing the subtree to continue to function separately, but attempting to SPLICE the tree again when the unicast route to core changes, or is reestablished in the case where there is no route available to the root; or
(3) FLUSH the sub-tree with parent node S and let the receivers downstream of S to individually rejoin the multicast tree The SPLICE messages are encapsulated in an IP header. The protocol ID of the IP header is set to the tree construction protocol using this splice mechanism.

The fields required in a SPLICE message are:
SPLICE Message: The header contains the SPLICE Message type, the message length, address of the router which originates the SPLICE message, the multicast group address.

The IP source address is set to the node originating the message and the IP destination address is set to the root.

SPLICE Acknowledgment Message: The header contains the SPLICE Acknowledgment Message type, the message length, the address of the router which originates the SPLICE Acknowledge message, multicast group address. The IP source address is set to the root node sending the SPLICE Acknowledge message and the IP destination address is set to the node which originates the SPLICE message.

A method for detecting a routing loop when repairing a partitioned multicast distribution tree, was presented. A splice control message is sent all the way to the root-node to find out if a routing loop is formed when a node, or a subtree, is joining the multicast distribution tree. Depending on the multicast application requirement, when a routing loop is detected during the repairing of a multicast distribution tree, the severed node may abort, or the repair can be deferred until the connectivity to the root-node is re-established. The loop detection and loop prevention method of the invention may be used with any protocol for constructing/splicing a partitioned tree, as a loop avoidance mechanism.

In this way, the control message used to repair a partitioned multicast tree message is not overloaded to function as both a graft message and a loop detection message. Without the capability of detecting a routing loop during the repair of a multicast distribution tree, the conventional multicast distribution tree construction protocols have to remove the downstream subtree entirely.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and the actions can be performed by a programmable processor executing a program of instructions by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each program can be implemented in a high-level procedural or object oriented programming language, or in assembly or machine language if desired; and in any case, the language can be a complied or interpreted language.

Suitable processors include, by way of example, both general and special purpose microprocessors. Generally, a processor will receive instructions and data from a read-only memory and/or a random access memory.

Generally, the system will include one or more mass storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the forgoing can be supplemented by, or incorporated in, ASICs (application-specific integrated circuits).

Numerous modifications, adaptations, and variations may be made to the particular embodiments of the invention without departing from the scope of the invention which is defined in the claims.

What is claimed is:

1. A method for avoiding routing loops when repairing a bidirection multicast distribution tree, comprising the steps of:
   (a) launching a splice message from an originating node attempting to join said bidirectional multicast distribution tree and transmitting said splice message towards a root-node along a communications path;
   (b) creating transient forwarding states in each node along said communications path for said multicast distribution tree wherein said splice message is forwarded by one or more nodes before reaching the root-node;
   (c) transmitting a splice acknowledgment message from only said root-node in response to receiving said splice message;
   (d) declaring loop-free if said splice message is not returned to said originating node and said splice acknowledgment message generated by said root-node is received by said originating node.

2. The method of claim 1, further comprising making said transient forwarding states permanent after performing step (d).

3. The method of claim 1, further including the step of:
   (e) if said splice acknowledgment message is not received during a pre-established time interval, terminating repairing said multicast distribution tree, after performing step (c).

4. The method of claim 1, further including the step of:
   (f) deferring repairing said multicast distribution tree if said splice message is returned to said originating node, after performing step (c).

5. The method of claim 4, wherein said step (f) further comprises attempting to join said multicast distribution tree via an equal cost route.

6. The method of claim 4, wherein said step (f) further comprises waiting a predetermined period of time before attempting to join said multicast distribution tree via a next hop.

7. The method of claim 4, wherein said step (f) further comprises flushing the subtree having said originating node as the parent node and allowing downstream nodes to individually join said multicast distribution tree.

8. A computer-readable medium containing computer executable instructions for avoiding routing loops when repairing a bidirectional multicast distribution tree, comprising the steps of:
   (a) launching a splice message from an originating node attempting to join said bidirectional multicast distribution tree and transmitting said splice message towards a root-node along a communications path;
   (b) creating transient forwarding states in each node along said communications path for said multicast distribution tree wherein said splice message is forwarded by one or more nodes before reaching the root-node;
   (c) transmitting a splice acknowledgment message from only said root-node in response to receiving said splice message;
   (d) declaring loop-free if said splice message is not returned to said originating node and said splice acknowledgment message generated by said root-node is received by said originating node.

9. The computer-readable medium of claim 8, further performing the step of:
   if said splice acknowledgment message is not received during a pre-established time interval, terminating repairing said multicast distribution tree, after performing step (c).

10. The computer-readable medium of claim 8, further performing the step of:

deferring repairing said multicast distribution tree if said splice message is returned to said originating node, after performing step (c).

11. The computer-readable medium of claim 10, further comprising the substep of attempting to join said multicast distribution tree via an equal cost route.

12. The computer-readable medium of claim 10, further comprising the substep of waiting for a predetermined period of time before attempting to join said multicast distribution tree via a next hop.

13. The computer-readable medium of claim 10, further comprising the substep of flushing the subtree having said originating node as the parent node and allowing downstream nodes to individually join said multicast distribution tree.

* * * * *